CYCLIC AND MULTIPLICATION BY 2 MOD n PERMUTATION DECODER FOR SYSTEMATIC CODES

Filed Nov. 15, 1963 6 Sheets-Sheet 1

INVENTOR
F. J. MAC WILLIAMS
BY
Lucian C. Canepa
ATTORNEY

CYCLIC AND MULTIPLICATION BY 2 MOD n PERMUTATION DECODER FOR SYSTEMATIC CODES

Filed Nov. 15, 1963

March 7, 1967 F. J. MacWILLIAMS 3,308,429

CYCLIC AND MULTIPLICATION BY 2 MOD n PERMUTATION DECODER FOR SYSTEMATIC CODES

Filed Nov. 15, 1963 6 Sheets-Sheet 3

FIG. 4

| SEQUENCE NO. | n-k CHECK DIGITS | k INFORMATION DIGITS |
|---|---|---|
| 1 | 0 0 1 | 0 1 1 0 |
| 2 | 0 1 0 | 1 1 0 0 |
| 3 | 1 0 1 | 1 0 0 0 |
| 4 | 0 1 1 | 0 0 0 1 |
| 5 | 1 1 0 | 0 0 1 0 |
| 6 | 1 0 0 | 0 1 0 1 |
| 7 | 0 0 0 | 1 0 1 1 |

$n=7,\ k=4,\ e=1$

FIG. 5

| ROW NO. | | n-k CHECK DIGITS | | | k INFORMATION DIGITS | |
|---|---|---|---|---|---|---|
| 1 | RECEIVED SEQUENCE = V | 0 | 0 | 1 | 0 1 1 [1] | ERRONEOUS DIGIT |
| 2 | CALCULATED CHECK DIGITS | 0 | 1 | 0 | | |
| 3 | COMPARISON OF CALCULATED CHECK DIGITS WITH CHECK DIGITS OF V | | d | d | | DISTANCE = 2, > e |
| 4 | $1^{ST}$ PERMUTATION OF V = VT | 0 | 1 | 0 | 1 1 [1] 0 | |
| 5 | CALCULATED CHECK DIGITS | 0 | 0 | 1 | | |
| 6 | COMPARISON OF CALCULATED CHECK DIGITS WITH CHECK DIGITS OF VT | | d | d | | DISTANCE = 2, > e |
| 7 | $2^{ND}$ PERMUTATION OF $V = VT^2$ | 1 | 0 | 1 | 1 [1] 0 0 | |
| 8 | CALCULATED CHECK DIGITS | 0 | 1 | 0 | | |
| 9 | COMPARISON OF CALCULATED CHECK DIGITS WITH CHECK DIGITS OF $VT^2$ | d | d | d | | DISTANCE = 3, > e |
| 10 | $3^{RD}$ PERMUTATION OF $V = VT^3$ | 0 | 1 | 1 | [1] 0 0 1 | |
| 11 | CALCULATED CHECK DIGITS | 1 | 1 | 0 | | |
| 12 | COMPARISON OF CALCULATED CHECK DIGITS WITH CHECK DIGITS OF $VT^3$ | d | | d | | DISTANCE = 2, > e |
| 13 | $4^{TH}$ PERMUTATION OF $V = VT^4$ | 1 | 1 | [1] | 0 0 1 0 | |
| 14 | CALCULATED CHECK DIGITS | 1 | 1 | 0 | | |
| 15 | COMPARISON OF CALCULATED CHECK DIGITS WITH CHECK DIGITS OF $VT^4$ | | | d | | DISTANCE = 1, = e |
| 16 | CORRECT VERSION OF $VT^4 = A$ | 1 | 1 | 0 | 0 0 1 0 | |

United States Patent Office 3,308,429
Patented Mar. 7, 1967

3,308,429

CYCLIC AND MULTIPLICATION BY 2 MOD n PERMUTATION DECODER FOR SYSTEMATIC CODES

Florence J. MacWilliams, Holmdel, N.J., assignor to Bell Telephone Laboratories, Incorporated, New York, N.Y., a corporation of New York Filed Nov. 15, 1963, Ser. No. 324,004
7 Claims. (Cl. 340—146.1)

This invention relates to digital information processing systems and more particularly to the automatic correction of errors in such systems.

The problem of correctly transmitting digital signals over a noisy channel is a significant one whose solution has been actively sought. Some illustrative situations in which this problem arises are: when telephone lines subject to error impulses are being used to transmit data in digital form; when an imperfect medium such as magnetic tape or a photographic emulsion is used to store digital data; or when operations on digital signals are being carried out by means of circuits constructed of devices such as relays, diodes or transistors which have a probability of error.

By the use of redundancy it is possible to encode a message in such a way that a decoder is able to extract the original information content therefrom despite the fact that the message may have been mutilated during processing.

An object of the present invention is the improvement of digital information processing systems.

More specifically, an object of this invention is a redundant digital information processing system whose error-correcting capabilities extend to multiple errors.

Another object of the present invention is a self-correcting information processing system whose over-all organization is characterized by simplicity of design.

These and other objects of the present invention are realized in a specific illustrative system embodiment thereof which comprises a novel decoder to which encoded information sequences of a systematic code are applied via a noisy transmission channel. The information sequences are encoded to contain sufficient redundancy to permit them to be slightly mutilated by the noisy channel and still be correctly interpreted by the decoder.

Each encoded information sequence received by an illustrative decoder made in accordance with the principles of the present invention includes $n$ digits, the first $k$ of which are information digits and the remainder of which are check digits. The check digits are derived from the information digits in accordance with a predetermined parity relationship which makes it possible to automatically correct any $\leq e$ errors occurring in each $n$-digit sequence.

It is characteristic of the sequences of a systematic code embodied in an illustrative system made in accordance with this invention that they have associated therewith a set of $r$ permutations which preserve the code while at the same time being able to move any group of $\leq e$ errors out of the first $k$ (information) digit positions of a received sequence. In other words, if a permutation of the set is applied to every digit of a received code sequence, the sequence is changed into another sequence of the systematic code. Repeated permutations of the received sequence move any $\leq e$ errors present therein out of the information digit positions, whereby a particular sequence of the systematic code may then be identified as corresponding to the permuted sequence. Then selective permuting of the particular sequence to exactly compensate for the repeated permutations of the originally-received sequence converts the particular sequence into a corrected version of the received sequence.

Briefly, a decoder made in accordance with the principles of the present invention comprises an $n$-stage permutation register for storing a sequence received from an encoder over a noisy transmission channel. Connected to the first $k$ (information) stages of the register is a parity check digit calculator for deriving $n-k$ check digits from the $k$ information digits of the received sequence. Advantageously, this derivation is carried out in accordance with the same parity relationship imposed by the encoder. Accordingly, if no errors are present in the received sequence, the check digits calculated by the decoder are identical to those stored in the last $n-k$ (check) stages of the register. Assume that the number of errors in the received sequence is $\leq e$. If errors are present in the check digit positions but not in the information digit positions of the received sequence, the calculated check digits differ from the received check digits in $\leq e$ places. In this case the decoder substitutes the calculated check digits for the erroneous set of received check digits, and a corrected version of the mutilated sequence is then available in the register for transfer therefrom.

On the other hand, if an error is present in at least one of the information digit positions of the received sequence, the calculated check digits are found to differ in $>e$ places from the corresponding check digits stored in the last $n-k$ stages of the register. In this case the received sequence is then successively permuted, with a parity check digit calculation and a comparison between the calculated digits and the corresponding check digits of the permuted sequence being performed following each permutation. When the two sets of check digits are found to differ in $\leq e$ places, after $x$ permutation steps, it is an indication that the decoder has succeeded in moving all errors out of the first $k$ stages of the register. At that point the calculated check digits are substituted for the digits stored in the last $n-k$ stages of the register, whereby the register then contains a correct version of a particular one of the sequences of the systematic code. This current sequence is not, however, a corrected version of the received sequence. Instead, it is displaced from the corrected version of the received sequence by the successive permutation steps applied to the received sequence. Therefore, to obtain the desired sequence, it is necessary to compensate for these permutation steps. This may be done either by permuting the particular corrected sequence back through the $x$ permutation steps applied to the received sequence or by permuting the particular corrected sequence forward through $r-x$ additional permutation steps. Whichever approach is taken, the permutation register then has stored therein a corrected version of the received sequence.

It is a feature of the present invention that a self-correcting digital information processing system include a decoder which comprises a register for selectively permuting received digital sequences.

It is another feature of this invention that a decoder comprise an $n$-stage permutation register for storing an $n$-digit received sequence, a first circuit for calculating $n-k$ parity check digits from the digits stored in the first $k$ stages of the register, a second circuit for comparing the calculated check digits with the check digits stored in the last $n-k$ stages of the register, and a third circuit for selectively permuting the $n$ digits stored in the register if the second circuit indicates that the calculated check digits and the check digits of the received sequence differ in $>e$ digit positions.

A complete understanding of the present invention and of the above and other objects, features and advantages thereof, may be gained from a consideration of the following detailed description of a specific illustrative embodiment thereof presented hereinbelow in connection with the accompanying drawing, in which:

FIG. 4 is a partial listing of the information sequences of a particular systematic code adapted to be processed by the system shown in FIG. 1;

FIG. 5 represents the manner in which the illustrative decoder shown in FIG. 1 automatically corrects one of the FIG. 4 sequences.

Figure 1:
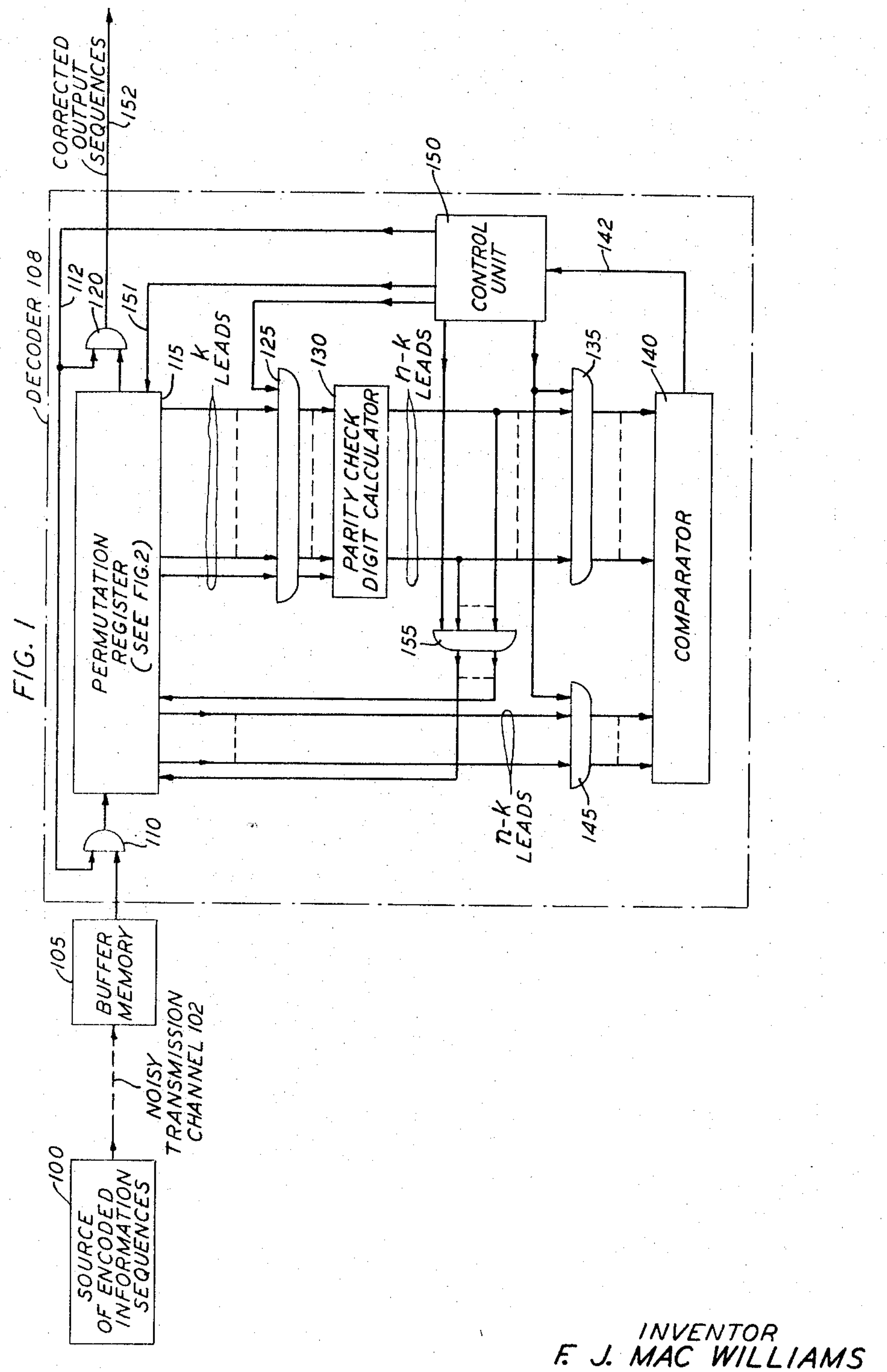
FIG. 1 shows an information processing system which includes a specific illustrative decoder made in accordance with the principles of the present invention.

The system shown in FIG. 1 includes a source 100 for supplying a group of encoded information sequences each of which is a member of a systematic code. Each of the sequences supplied by the source 100 includes $n$ digits, the first $k$ of which are information digits and the last $n-k$ of which are check digits that are formed with respect to the information digits in accordance with a predetermined parity relationship. If the minimum distance between any two sequences of the code is $2e+1$, where $e$ is any positive integer, the code is sufficiently redundant that it is possible to correct all occurrences of $\leq e$ errors in an $n$-digit sequence thereof. This basic concept is well-known in the coding art, being described, for example, in R. W. Hamming—B. D. Holbrook, Reissue Patent 23,601, granted December 23, 1952, and in "A Class of Binary Signaling Alphabets" by D. Slepian, The Bell System Technical Journal, 1956, pages 203–234.

Sequences supplied by the source 100 are coupled via a noisy or error-prone transmission channel 102 to a buffer memory 105 from which they are applied to a specific illustrative decoder 108 which is constructed in accordance with the principles of the present invention. It is to be understood that the transmission channel 102 may be of the type that interconnects remotely-spaced encoding and decoding units, such as in a long distance communication system. On the other hand, the channel 102 may equally well be considered to be of the type which interconnects encoding and decoding units associated with information processing equipment positioned at a single location. In either case the decoder is capable of reconstructing an originally-transmitted information sequence even if the sequence is mutilated in adjacent or nonadjacent digit positions.

The decoder 108 shown in FIG. 1 includes a gate 110 through which information sequences stored in the buffer memory 105 are selectively gated to the input of an $n$-stage permutation register 115. (The decoder also includes an output gate 120 through which corrected sequences are gated, under control of signals from a unit 150, to an output line 152.) Selective enabling of the input gate 110 is accomplished by a signal applied thereto via a lead 112 from the control unit 150. (See the top row of FIG. 3A for a representation of the enabling signal applied at time $a_1$ to the gates 110 and 120.) By such gating, an $n$-digit information sequence is transferred into the $n$ stages of the register 115. Specifically, the first-in-time or information digits of the received sequence are stored in the $k$ right-hand stages of the register 115, and the $n-k$ parity check digits of the sequence are stored in the remaining $n-k$ stages of the register 115.

At time $b_1$ (FIG. 3A) the control unit 150 shown in FIG. 1 applies a gating or enabling signal to a gate 125 whose inputs are respectively connected to the outputs of the $k$ information stages of the register 115, whereby the $k$ information digits stored in the register are applied to a parity check digit calculator 130. In the calculator 130 a set of parity check digits is derived from the $k$ information digits in exactly the same manner in which they were derived in the source 100. At time $c_1$ (FIG. 3A) the control unit 150 applies an enabling signal to a gate 135, thereby to pass the check digits derived by the calculator 130 to a comparator circuit 140. At the same time ($c_1$) the control unit 150 applies an enabling signal to a gate 145 whose $n-k$ inputs are respectively connected to the outputs of the stages in the register 115 that have check digits stored therein. Accordingly, the check digits of the received sequence are applied to the comparator 140 at the same time as the derived or recalculated check digits are applied thereto.

Figure 3A:
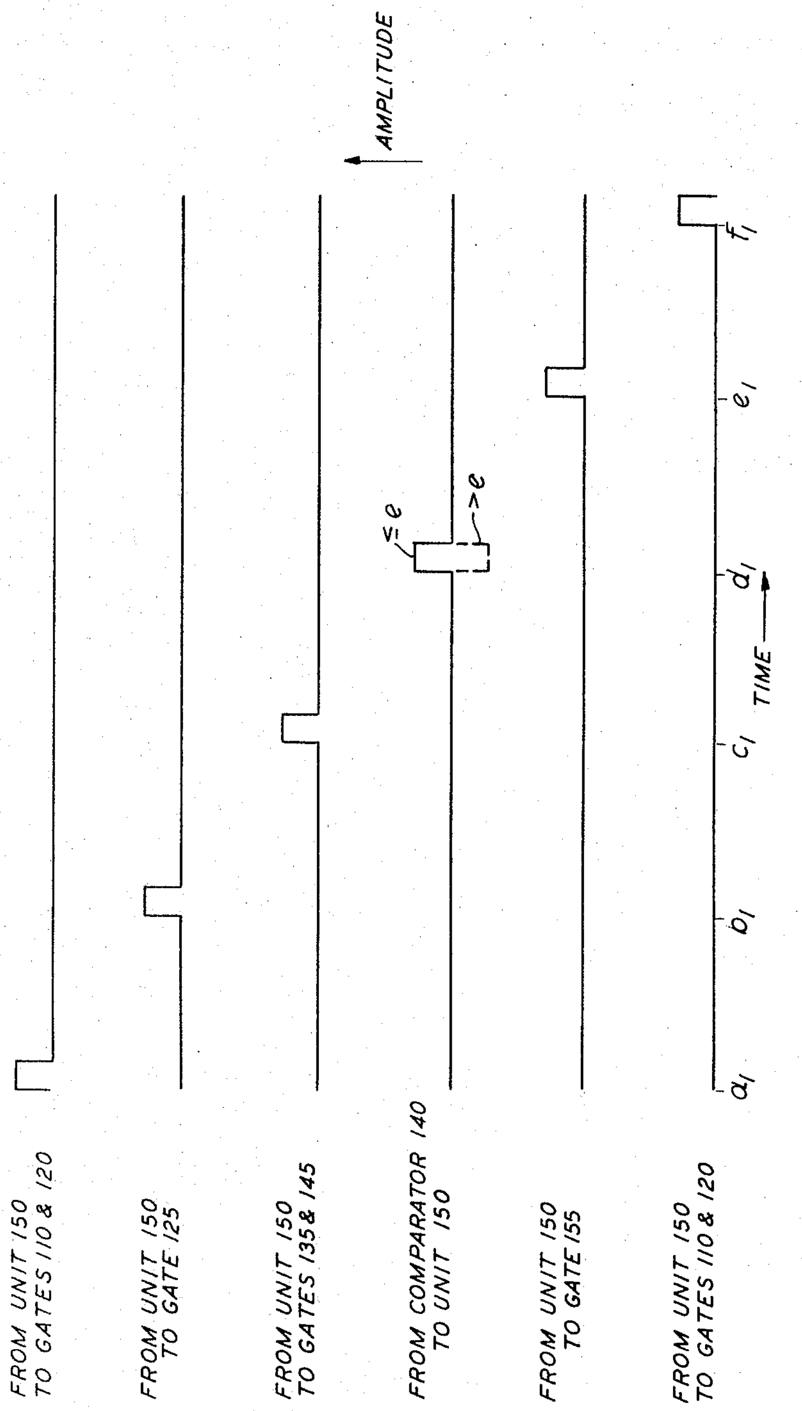
FIGS. 3A and 3B are timing diagrams indicative of the over-all mode of operation of the FIG. 1 decoder.

At time $d_1$ (FIG. 3A) the comparator 140 supplies to the control unit 150 via a lead 142 a signal indicative of the two aforementioned sets of check digits differing in $\leq e$ corresponding digit positions or a signal indicative of the two sets of check digits differing in $>e$ corresponding digit positions. Illustratively, the first-mentioned signal may be a positive pulse, as shown in FIG. 3A, and the second-mentioned signal may be a negative pulse, as shown in dashed outline in FIG. 3A. As will be evident from the detailed discussion to follow below, a positive pulse is reflective of the fact that whatever errors are present in the received sequence stored in the register 115 are limited to the check digit stages thereof. Hence, in that case, the substitution of the recalculated check digits for the check digits present in the register 115 provides therein a corrected version of the received sequence. This substitution is accomplished by an enabling pulse, at time $e_1$, from the control unit 150 to a gate 155, whereby the output of the calculator 130 is applied to the $n-k$ check digit stages of the register 115. The subsequent energization, at time $f_1$, of the gates 110 and 120 causes the corrected information sequence to be gated to the output line 152 and, in addition, causes the next following information sequence to be applied from the buffer memory 105 to the register 115 for decoding.

Assume, however, that the comparator 140 shown in FIG. 1 supplies a negative signal at time $d_1$ to the control unit 150. This eventuality is represented in a step-by-step manner in FIG. 3B wherein the fourth row thereof includes a negative pulse designated $>e$, thereby to indicate that the calculated check digits and the received check digits differ in $>e$ digit places. Such as indication signifies that at least one of the information digits of the received sequence was mutilated during transmission. In response to such a negative signal the unit 150 supplies a control signal to the register 115 via lead 151 to cause the sequence stored therein to be permuted one step of a set containing $r$ permutation steps. Following this permutation of the received sequence, the calculator 130 derives another set of parity check digits from the digits stored in the first $k$ stages of the register 115. Then the derived digits and the permuted digits stored in the last $n-k$ stages of the register 115 are compared. This permute-compare cycle is repeated $x$ times until the comparator 140 indicates to the control unit 150, at time $j_1$ (FIG. 3B), that the difference between the two sets of check digits is $\leq e$. In response to such an indication, the control unit 150 enables the gate 155 to cause the derived check digits to be substituted for the digits stored in the check digit stages of the register 115, whereby a correct version of a particular sequence of the systematic code is then stored in the register 115. Subsequently, the unit 150 causes the particular sequence in the register to be successively permuted back through the $x$ steps applied to the originally-received sequence. Alternatively, the unit 150 causes the particular sequence to be permuted through $r-x$ additional steps of the permutation set. In either case the result is to store a corrected version of the received sequence in the register 115 for subsequent transfer to the output line 152.

At this point a specific example will be helpful to a more detailed understanding of the mode of operation of the specific illustrative embodiment depicted in FIG. 1. Consider the sequences set forth in FIG. 4. These sequences are members of a systematic code in which $n=7$, $k=4$, $e=1$, and the minimum distance between any two sequences is $2e+1$. Inspection of these sequences reveals that each one is obtained from the sequence immediately thereabove simply by removing the left-hand one of the digits of the sequence above and affixing it to the right-hand side of the remaining digits. Thus, for example, by removing the left-hand "1" digit from sequence No. 3 shown in FIG. 4 and affixing it to the right-hand side of the remaining digits, sequence No. 4 is obtained. It is apparent that successive cyclic transformations or permutations of this type will succeed in moving any single erroneous information digit out of the four right-hand information digit positions and into one of the three left-hand check digit positions.

It is therefore evident that the sequences listed in FIG. 4 are members of a systematic code which has associated therewith a set of permutations that preserve the code while at the same time being able to move any set of $\leq e$ errors out of the first $k$ places of a code sequence. Specifically, if every digit of one of the sequences depicted in FIG. 4 is moved one position to the left, with the left-hand digit being affixed to the right-hand side of the sequence, the resulting modified sequence is seen to be another sequence of the systematic code. In the new sequence, however, the information digits are shifted in position from their original locations. Hence the code of which the FIG. 4 sequences are members is adapted to be decoded in accordance with the principles of the present invention.

Assume that four information digits 0110 are encoded by the source 100 (FIG. 1) in accordance with an error-correcting code for transmission over the noisy channel 102. For illustrative purposes it will be assumed herein that the encoding is done in accordance with one of the well known codes described in the aforementioned Hamming-Holbrook patent. The resulting encoded sequence is listed as sequence No. 1 in FIG. 4. Assume further that the first-in-time or right-hand digit of sequence No. 1 is mutilated during transmission over the channel 102, being changed from a "0" to a "1" indication. In that event the sequence V which is received by the permutation register 115 from the channel 102 via the memory 105 and the gate 110 has the form shown in row No. 1 of FIG. 5, in which row the right-hand or erroneous digit of the received sequence V has a box drawn around it for ease of identification.

Under the control of a signal applied from the unit 150 to the input gate 110, the digits of the received sequence V are applied to the respective stages of the permutation register 115. Subsequently the information digits of the sequence V are gated to the calculator 130 in which a set of check digits therefor is derived in accordance with the same parity relationship originally imposed by the source 100 during the encoding process. These calculated check digits, which are shown in row No. 2 of FIG. 5, are then gated to the comparator 140 in which they are compared with the last $n-k$ digits of the received sequence V.

Row No. 3 of FIG. 5 indicates the results of that comparison, each letter $d$ therein signifying that a *d*ifference or *d*iscrepancy exists between corresponding digits of the two sets of check digits. The distance between the two sets of check digits respectively represented in rows 1 and 2 is seen to be 2, which is $>e$. Hence, the next step in the decoding procedure is to permute the received sequence V. As indicated above, successive cyclic permutations will preserve the sequences of the particular systematic code being considered herein while at the same time shifting the received information digits out of the information digit positions. Therefore, each permutation T performed on the illustrative received sequence V will be of the cyclic type.

Row No. 4 of FIG. 5 represents the first cyclic permutation of the received sequence V. In this permuted sequence, designated VT, the erroneous information digit and its three associated information digits have each been shifted one digit position to the left. A set of check digits, represented in row No. 5, is then derived by the calculator 130 from the digits in the $k$ information digit position of the permuted sequence VT. A comparison of these calculated check digits with the digits in the check positions of the permuted sequence VT reveals that there is a distance of 2 therebetween, as indicated in row No. 6. In response to this indication, the illustrative decoder shown in FIG. 1 performs another cyclic permutation of the sequence stored in the register 115. This second permutation of the received sequence V, designated $VT^2$, is listed in row No. 7 of FIG. 5.

Repeated permute-compare cycles of the type described above are performed until, as indicated in row No. 15 of FIG. 5, the distance between the calculated check digits and the digits in the check positions of a permuted sequence is determined to be $\leq e$, thereby indicating that the erroneous received digit is no longer present in the information digit positions of the permuted sequence. In response to such a determination, the illustrative decoder considered herein substitutes the calculated check digits for the digits contained in the check digit positions of the permuted sequence $VT^4$, whereby a correct version A of $VT^4$ is formed, as shown in row No. 16 of FIG. 5.

The correct version A of $VT^4$ is, of course, not itself a corrected version of the received sequence V but is displaced from the corrected version by the number of cyclic permutations performed on the sequence V during the decoding operation. Since the sequence V was cyclically permuted four times, as represented by the sequences shown in rows 4, 7, 10 and 13 of FIG. 5, reverse shifting of the sequence A through four cyclic permutation steps will provide a corrected version of the sequence V. Specifically, note that the sequence A shown in row No. 16 of FIG. 5 corresponds to the sequence listed in row 5 of FIG. 4. Reverse shifting of this sequence four times exactly compensates for the permutation steps described above and thereby transforms the sequence A into the sequence shown in row No. 1 of FIG. 4. This sequence is seen to be the corrected version of the received sequence V. Gating of this corrected sequence to the output line 152 completes the decoding procedure.

Alternatively, the correct version A of $VT^4$ may be transformed into a corrected version of the received sequence V by continuing to forward shift (i.e., continuing to shift downward through the sequences of FIG. 4). This alternative is based on the fact that seven successive cyclic permutations of any one of the 7-digit sequences shown in FIG. 4 transforms that sequence back into itself. In other words, the associated set of permutations for the particular systematic code considered herein includes seven steps. To exactly compensate for a forward shift of four permutation steps, it is simply necessary to continue permuting in a forward direction through 7—4 or three additional steps. More generally, it is noted that an $n$-digit sequence which is a member of a cyclic code may be converted back into itself by $n$ successive permutation steps.

In view of the above, it is clear that the control unit 150 included in the illustrative decoder shown in FIG. 1 may be programmed to carry out the compensation step in either one of the two aforementioned alternative ways. In either case, the permutation register 115 will, as a result, have stored therein a corrected version of the received sequence V.

In describing permutations in general, it is convenient to label the digit positions of the $V^n$ by the numbers $n-1$, $n-2, \ldots, 1, 0$, where $V^n$ is the set of all possible digital sequences of length $n$. If $\omega$ stands for one of these numbers, the cyclic permutation described above may be represented as $T:\omega\rightarrow\omega+1$ (addition mod $n$). The powers of the cyclic permutation are $$T^2:\omega\rightarrow\omega+2;\ T^3:\omega\rightarrow\omega+3, \ldots, T^n:\omega\rightarrow\omega+n=\omega$$

The subset of the sequences of $V^n$ which is invariant under T is a cyclic systematic code in $V^n$. This code is also invariant under $T^2$, $T^3$ etc.

Assume that we wish to decode a cyclic code having parameters *n, k* and *e*. Successive cyclic shifts will eventually bring any *k* consecutive digits to the first *k* positions and, hence, will move out of the first *k* positions any error pattern in which there is a gap of length $\geq k$. In particular, the sequence I, T, . . . , $T^{n-1}$ will always correct all single errors, where I is identical to the received sequence. In addition, it is noted that this sequence will correct all double errors if $$k<\frac{n}{2}$$

The decoding procedure set forth above will not, however, correct an error pattern in which there is no gap of length $\geq k$. Suppose, for example, that $n=23$ and $k=12$. For such a sequence the error pattern shown below cannot be corrected by cyclic shifts alone.

22 21 20 X 18 17 16 15 14 13 12 11 10 X 8 7 6 5 4 3 2 1 X

The X's in digit positions 0, 9 and 19 of this sequence indicate errors in those positions.

To deal with such cases we introduce another permutation U.

$$U:\omega\rightarrow 2\omega \text{ (multiplication mod } n)$$

and its powers $$U^2:\omega\rightarrow 4\omega,\ U^3:\omega\rightarrow 8\omega,\ \text{etc.}$$

If *n* is odd there exists a least integer *t* such that $$2^t\equiv 1 \text{ mod } n;\ \text{and } U^t=I$$

The choice of U is motivated by the fact that it has been determined that every cyclic systematic code of odd length (*n* is an odd integer) is invariant under U and the powers of U.

By means of the permutation U the error pattern 0, 9, 19 noted above is changed into 0, 18, 15. This pattern can then be moved out of the first twelve (*k*) places by 21 cyclic shifts.

The permutation group on $n-1, n-2, \ldots, 1, 0$ generated by T and U may be designated $G_n$. It is easy to check that $TU=UT^2$; hence we may represent every permutation in $G_n$ in the form $U^iT^j$, with $0\leq i\leq t-1$, $0\leq j\leq n-1$. Now every power of U leaves 0 fixed, and no power of T (except the identity I) leaves 0 fixed; thus $U^iT^j=U^hT^k$ if and only if $i=h$ mod *t* and $j=k$ mod *n*. It follows that the group $G_n$ is of order *nt* and includes the permutations:

$$\begin{array}{cccc} I, & T, & T^2, \ldots, & T^{n-1} \\ U, & UT, & UT^2, \ldots, & UT^{n-1} \\ U^2, & U^2T, & U^2T^2, \ldots, & U^2T^{n-1} \\ & & \vdots & \\ U^{t-1}, & U^{t-1}T, & U^{t-1}T^2, \ldots, & U^{t-1}T^{n-1} \end{array}$$

Let $0\leq u_1<u_2<\ldots<u_s\leq n-1$ (*n* odd), be a set of integers; we suppose that errors occur in places $u_1, \ldots, u_s$. Let $g(u_1, \ldots, u_s, n)$ be the length of the maximum gap which can be inserted in this sequence by repeated multiplication by 2 mod *n*. Let $u_{ik}$ be the integer $<n$ such that $2^ku_i-u_{ik}$ is divisible by *n*.

$$g(u_1, \ldots, u_s, n)=\underset{i,j,k,}{\text{Max.}}|u_{ik}-u_{jk}|-1$$

Let $g(s,n)$ be the minimum value of this maximum gap for all possible choices of the *s* values $u_1, \ldots, u_s$.

$$g(s,n)=\underset{u_1,\ldots,u_s}{\text{Min.}}\quad g(u_1, \ldots, u_s,n)$$

The group $G_n$ then contains a permutation which moves any set of *s* errors out of the first $g(s,n)$ places. Clearly $s'<s$ implies $g(s',n)\geq g(s,n)$. Hence a cyclic *n, k, e* code with *n* odd may be decoded by $G_n$ if and only if $k\leq g(e,n)$.

It is desirable, if possible, to use only part of $G_n$ in the decoding sequence. As an example, we consider the code with $n=23$, $k=12$, $e=3$. In this case one of the permutations U, $U^2$, $U^{11}$ will always create a gap of length at least 12 in any set of 3 errors. Hence an abbreviated decoding sequence for this code is:

$$\begin{array}{cccc} I, & T, & T^2, \ldots, & T^{22} \\ U, & UT, & UT^2, \ldots, & UT^{22} \\ U^2, & U^2T, & U^2T^2, \ldots, & U^2T^{22} \\ U^{11}, & U^{11}T, & U^{11}T^2, \ldots, & U^{11}T^{22} \end{array}$$

In practice it is convenient to add one more permutation to the decoding permutations so that a sequence passing through the entire set emerges in its original form. In the particular $n=23$, $k=12$ example considered herein, this additional permutation is TU. The final output of the permutation register 115 is then the corrected version of the received sequence.

Figure 6:
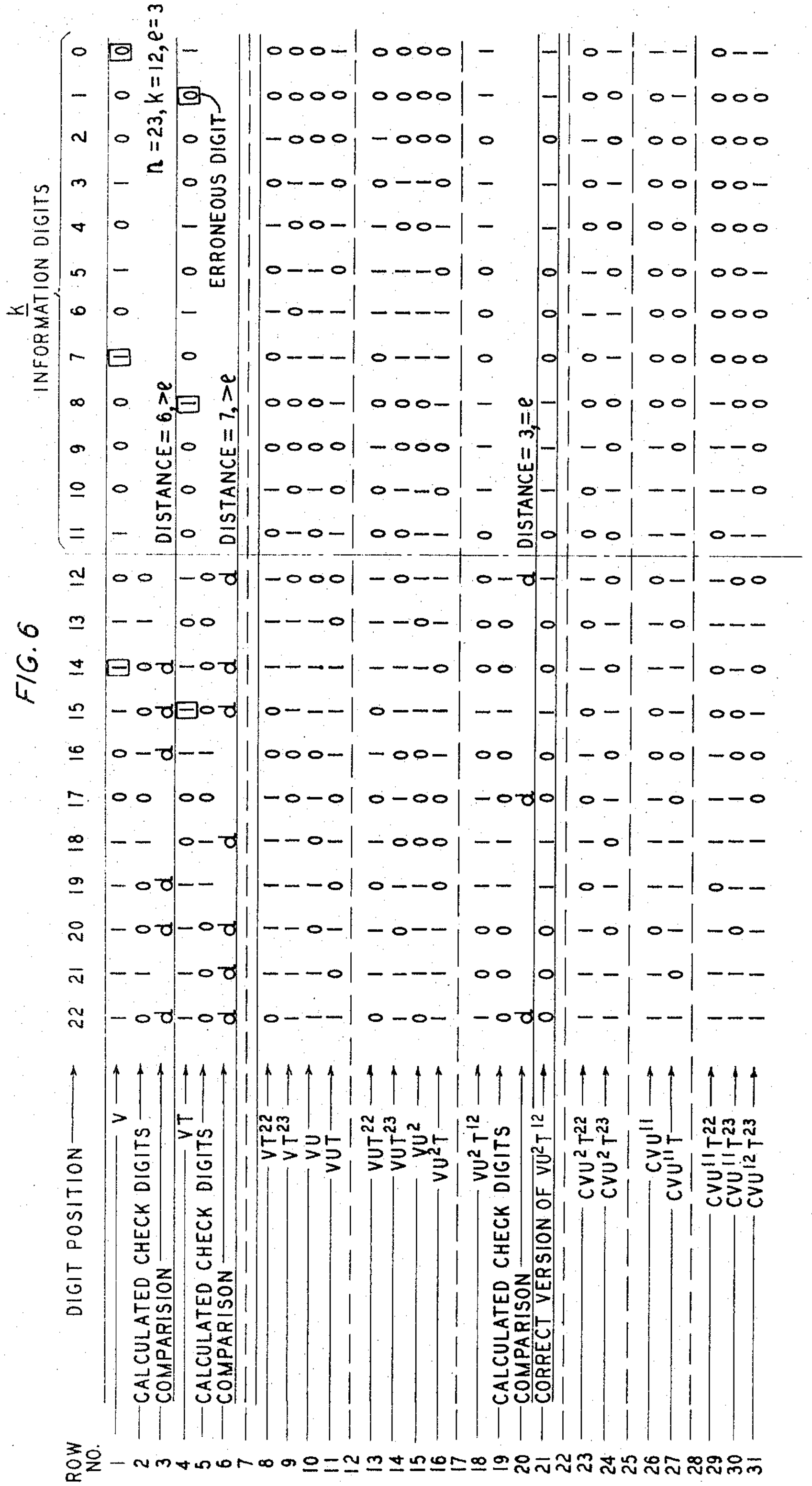
FIG. 6 represents the manner in which the FIG. 1 decoder automatically corrects an erroneous sequence of another systematic code.

FIG. 6 illustrates in detail the manner in which a mutilated 23-digit information sequence is decoded in accordance with the principles of the present invention. The particular received sequence shown in row No. 1 of FIG. 6 is a member of an $n=23$, $k=12$, $e=3$ systematic code which has been mutilated by errors in digit positions 0, 7 and 14. As discussed before, this general pattern of errors in such a sequence can be decoded by applying thereto permutations of the T and U variety in accordance with the particular abbreviated permutation sequence set forth above.

In row No. 2 of FIG. 6 are shown the check digits derived by the calculator 130 of FIG. 1 from the twelve information digits of the 23-digit received sequence V. Row No. 3 indicates that the calculated check digits and the received check digits differ in 6 digit positions, which, of course, is $>e$. In response to this comparison operation the illustrative decoder performs a cyclic permutation T of the received sequence, as indicated in row No. 4 of FIG. 6. Then the calculator 130 derives a set of check digits from the digits present in the information digit stages of the permutation register 115. The subsequent comparison between the calculated digits and the digits present in the check digit stages of the register 115 is represented in row No. 6.

Row No. 7 of FIG. 6 is intended to indicate that the sequence VT is actually successively permuted through the steps $VT^2$, $VT_3$, . . . , $VT^{21}$. It is to be understood that a check digit calculation and a comparison of the type described above are performed subsequent to each of these permutation steps. For the specific example considered herein, each of these comparisons shows that the distance between the two sets of compared digits is $>e$. Hence, additional permute-compare steps of the type indicated in shortened form in rows 8–17 are performed by the illustrative decoder shown in FIG. 1. Finally, subsequent to the permutation step represented in row No. 18, the calculated check digits are determined by the comparator 140 to differ in only three (*e*) digit positions from the digits stored in the check digit stages of the register 115. In response to this determination the calculated check digits are respectively applied to these register stages. The resulting sequence stored in the register 115 is represented in row No. 21 of FIG. 6. Then, by successively permuting the information sequence shown in row No. 21 through the additional permutation steps represented in the abbreviated decoding sequence set forth above, with a final permutation TU, a corrected version of the received sequence V is obtained. These successive permutation steps are represented in rows 22–31 of FIG. 6. It is noted that the sequence represented in row No. 31 is identical to that shown in row No. 1 except that the erroneous digits in positions 0, 7 and 14 of the received sequence V have been respectively corrected. Thus the automatic error-correcting abilities of the illustrative decoder shown in FIG. 1 have been demonstrated in detail for a specific systematic code having particular *n, k* and *e* parameters.

In the two specific decoding examples considered above and represented in FIGS. 5 and 6, respectively, the register 115 performed, under the control of signals from the unit 150, permutation steps of the T and U type. One illustrative register having this capability and suitable for inclusion in the specific decoder depicted in FIG. 1 is shown in detail in FIG. 2. The FIG. 2 register 115 includes $n$ bistable circuits 205, 215, . . . , 220, 225 and 230 to which the digits of a sequence to be decoded are applied from the input gate 110. After an information sequence has been gated into the register 115 the right-hand bistable circuit 230 will have stored therein the first-received information digit, and the left-hand bistable circuit 205 will have stored therein the last-received parity check digit.

Figure 2:
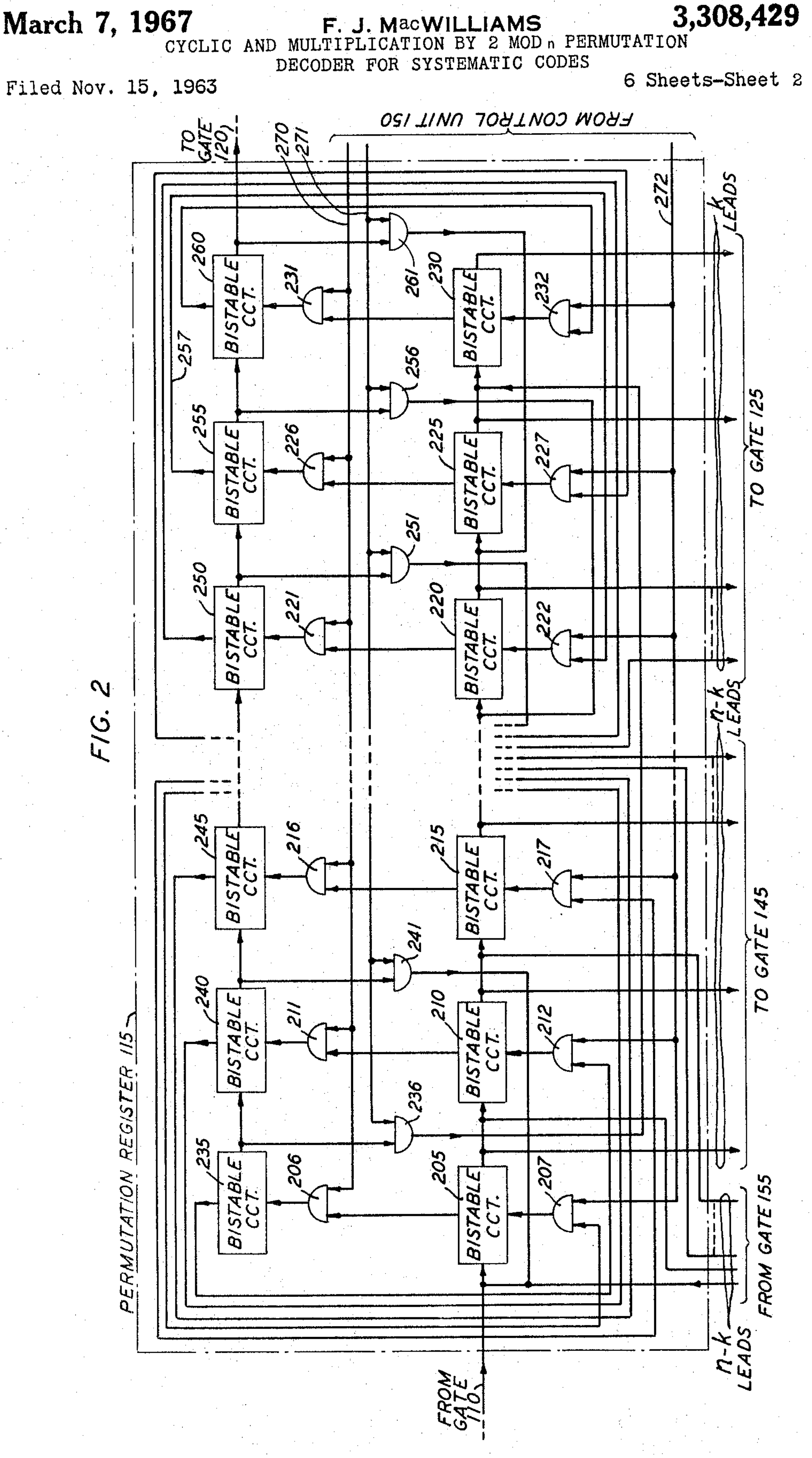
FIG. 2 depicts the details of one portion of the decoder shown in FIG. 1.

In the FIG. 2 register $k$ leads extend from the respective outputs of the $k$ right-hand bistable circuits to the gate 125 (FIG. 1) and $n-k$ leads extend from the respective outputs of the $n-k$ left-hand bistable circuits to the gate 145 (FIG. 1). In addition, $n-k$ leads extend from the gate 155 (FIG. 1) to respective inputs of the $n-k$ left-hand bistable circuits shown in FIG. 2.

The register 115 shown in FIG. 2 also includes an upper set of $n$ bistable circuits 235, 240, 245, . . . , 250, 255 and 260. Corresponding ones of the lower and upper sets of bistable circuits are directly interconnected by $n$ gate circuits 206, 211, 216, . . . , 221, 226 and 231, each of which includes an enabling input terminal that is connected by a lead 270 to the control unit 150. Further, the register 115 includes a second set of gate circuits 236, 241, . . . , 251, 256 and 261, each of which directly interconnects the output of a different one of the upper set of bistable circuits to an input of a lower bistable circuit displaced one position to the left. Thus, by way of specific example, it is seen that one output of the upper left-hand bistable circuit 235 is connected via the gate circuit 236 to one input of the lower right-hand bistable circuit 230. Furthermore, it is noted that according to this pattern of interconnections, one output of the upper right-hand bistable circuit 260 is connected via the gate circuit 261 to an input of the second-from-the-right lower bistable circuit 225. By means of this second set of gate circuits, an information sequence stored in the upper bistable circuits may be transferred to the lower set and cyclically permuted one step to the left. In other words, the permutation T may be thereby realized. Additionally, it is noted that FIG. 2 includes an enabling lead 271 by means of which control signals are applied to the gate circuits 236, 241, . . . , 251, 256 and 261 from the unit 150.

Additionally, a third set of gate circuits 207, 212, 217, . . . , 222, 227 and 232, selectively interconnect the upper bistable circuits to the lower bistable circuits in accordance with a predetermined pattern which implements the basic permutation U described above. For example, one output of the upper bistable circuit 255 is connected via a lead 257 to an input of the gate circuit 222 whose output is connected to an input of the lower bistable circuit 220. Thus, whatever digit is stored in the upper circuit 255 may be transferred to the lower circuit 220 by enabling the gate circuit 222, whereby the digit stored in position No. 1 in the upper bistable circuits can be transferred to position No. 2 in the lower bistable circuits. In this way the permutation U is implemented with respect to digit position No. 1. In a similar manner the other ones of the third set of gate circuits selectively interconnect the upper and lower bistable circuits to implement this permutation. It is noted that this third set of gates is enabled via a lead 272 which extends from the control unit 150.

Although in FIG. 1 only one lead 151 is shown as directly connecting the control unit 150 to the permutation register 115, it is to be understood that that single lead is simply intended to be a generic representation of the lead or leads that may actually extend between the unit 150 and the register 115. Thus in FIG. 2 three such leads 270, 271 and 272 are shown.

Figure 3B:
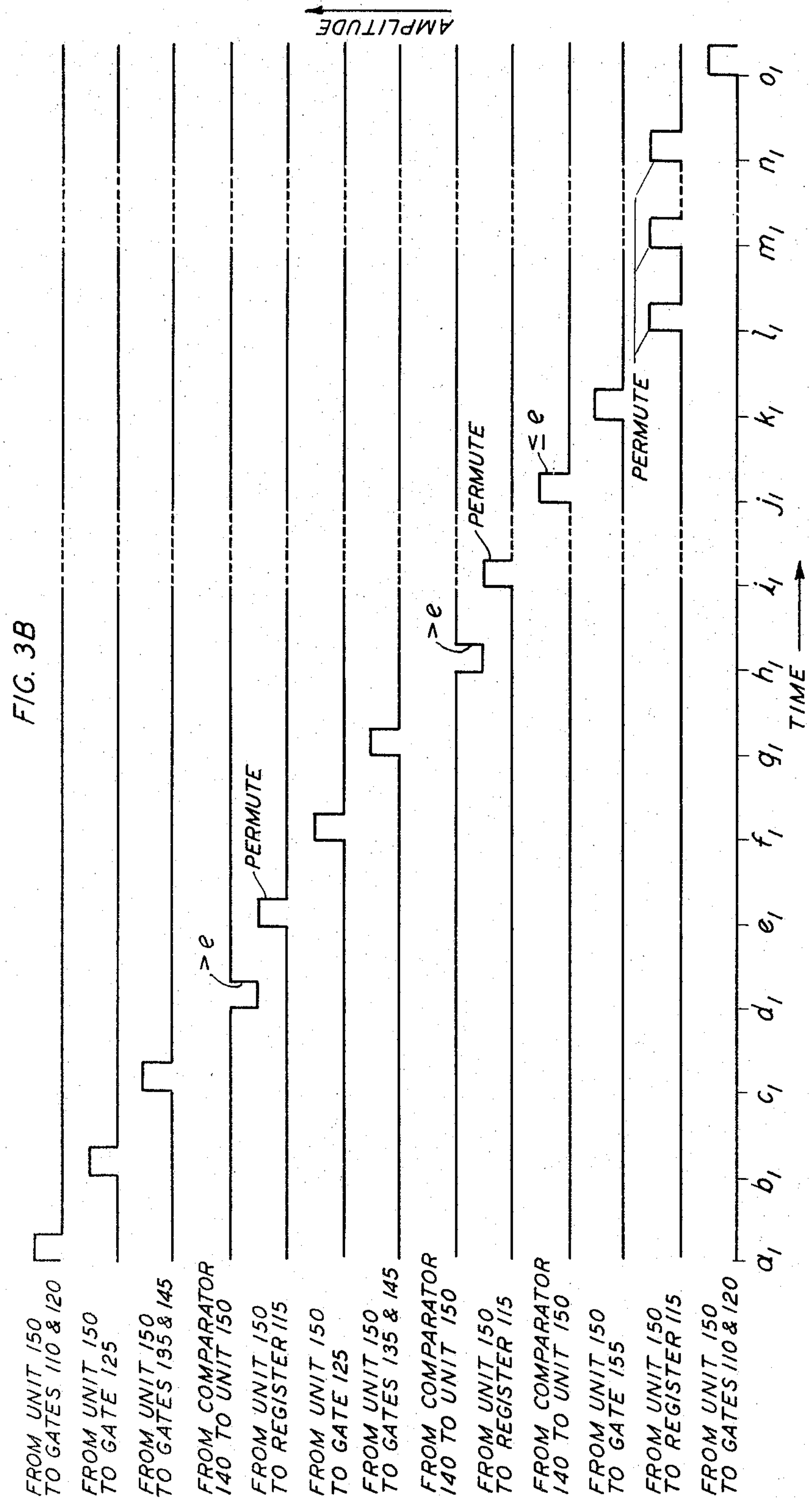

Additionally, it is noted that the nature of the control signal applied by the unit 150 to the register 115 may be different than the generic representation thereof in FIGS. 3A and 3B which show a single pulse applied therebetween. Thus, in the specific illustrative register 115 shown in FIG. 2, the permutation T is implemented by applying two successive pulses to the lines 270 and 271 in that order, thereby to cause the contents of the lower set of bistable circuits to be transferred in parallel to the upper set of bistable circuits and then transferred back to the lower set with a shift of one digit position to the right. Also, it is noted that the permutation U is actually implemented by applying two successive pulses to the lines 270 and 272 in that order, thereby to cause the contents of the lower set of bistable circuits to be transferred in parallel to the upper set and then transferred back to the lower set with the specific permutation determined by the aforedescribed connections to the gate circuits 207, 212, 217, . . . , 222, 227, 232.

The details of the bistable circuits and the gate circuits represented in block form in FIG. 2 are not shown in the drawing because their actual configurations, as well as the addition thereto of a suitable shift signal source to move sequences into and out of the register 115, are considered to be well within the skill of the art. Moreover, the implementations of the gates 110, 120, 125, 135, 145 and 155, the calculator 130, the comparator 140 and the control unit 150, all shown in FIG. 1, are considered, in view of the end requirements therefor set forth above, to be clearly within the skill of the art and are accordingly not set forth in detail herein.

Finally, it is to be understood that the above-described arrangements are only illustrative of the application of the principles of the present invention. Numerous other arrangements may be described by those skilled in the art without departing from the spirit and scope of the invention. For example, the decoding arrangement described herein may be arranged to operate in a generally parallel rather than sequential manner by splitting the arrangement into a number of parallel sections each of which contains a register and circuitry connected thereto for performing a permutation. In addition, each section of such a parallel arrangement includes associated circuitry for calculating parity check digits. Also, the specific illustrative decoder considered above can be modified such that the digits of an information sequence are applied to and abstracted from the permutation register 115 in a parallel rather than sequential manner. In these and other not specifically enumerated ways, permutation decoding of systematic codes in accordance with the principles of this invention can be speeded up. Also, the number $r$ of permutations required of the permutation register 115 may be greatly reduced by careful study of the particular code to be decoded.

What is claimed is:

1. In combination, means for storing a digital sequence which is a member of a systematic code, and means connected to said storing means for rearranging the positions of the constituent digits of said stored sequence by cyclic and multiplication by 2 mod $n$ permutations, where $n$ is the number of digits in the sequence and is an odd integer, and for registering said rearranged sequence in said storing means.

2. In combination in a system for processing digital sequences of a systematic code, each sequence including information digit positions and parity check digit positions, means for storing a received sequence which contains $\leq e$ errors, where $e$ is a positive integer defined such that the minimum distance between any two sequences of said code is at least $2e+1$, and means coupled to said storing means for modifying said sequences by cyclic and multiplication by 2 mod $n$ permutations, where $n$ is the number of digits in each sequence and is an odd integer, such that all errors in said information digit positions are moved into said parity check positions, and for registering said modified sequence in said storing means.

3. A system for processing an $n$-digit information sequence which includes $k$ information digit positions and $n-k$ check digit positions, where $n$ and $k$ are positive integers and $n$ is odd, said system comprising an $n$-stage register $k$ of whose stages are designated information stages and $n-k$ of whose stages are designated check digit stages, means for initially registering the information digits of said sequence in the respective information stages of said register and for registering the check digits of said sequence in the respective check stages thereof, and means connected to the stages of said register and responsive to at least one of said information stages containing an erroneous digit for selectively modifying said sequence by cyclic and multiplication by 2 mod $n$ permutations to cause said erroneous digit(s) to be transferred to said check digit positions, and for registering said modified sequence in said register.

4. In combination in a system for automatically correcting digital sequences each of which is mutilated in $\leq e$ digit places, where $e$ is a positive integer defined such that the minimum distance between any two of said sequences is at least $2e+1$, each of said sequences being a member of a systematic code and including $k$ information digits and $n-k$ parity check digits each of which bears a preassigned parity relationship with selected ones of said information digits, where $n$, $k$ and $e$ are positive integers defining the systematic code, partity generating means responsive to the information digits of a particular sequence for calculating parity digits therefor in accordance with said preassigned parity relationship, means for comparing said calculated parity digits with the parity digits of said particular sequence and for determining the distance therebetween, means responsive to said comparing means determining that said distance is $\leq e$ for substituting said calculated parity digits for the parity digits of said particular sequence, and means responsive to said comparing means determining that said distance is $>e$ for selectively modifying the arrangement of digits in said particular sequence.

5. In combination in a self-correcting information processing system, means responsive to selected digits of a received digital sequence for calculating the other digits thereof in accordance with a predetermined parity relationship, means for comparing said calculated digits with the corresponding digits of said received sequence and for determining the distance therebetween, means responsive to a determination that said distance is less than or equal to a threshold number $e$, where $e$ is a positive integer defined such that the minimum distance between any two of said sequences is at least $2e+1$, for substituting said calculated digits for the corresponding digits in said sequence, means responsive to a determination that said distance is greater than said threshold number for successively permuting said received sequence in accordance with a predetermined set of permutations, control means connected to said calculating means for activating said calculating means to respond to selected digits of each permuted sequence to calculate the remaining digits thereof in accordance with said predetermined parity relationship, said control means also being connected to said comparing means for activating said comparing means subsequent to each permutation to determine the distance between said calculated digits and the corresponding digits in each permuted sequence, and means responsive to an indication that the distance between the digits of a particular permuted sequence and their corresponding calculated digits is less than or equal to said threshold number for completing said predetermined set of permutations, thereby to provide a corrected version of said received digital sequence.

6. In combination in a self-correcting information processing system, a permutation register for storing a digital sequence which includes information digits and parity check digits, first means connected to said register and responsive to the values of the information digits of said sequence for calculating check digits therefor in accordance with a predetermined parity relationship, second means connected to said first means and to said register for comparing said calculated check digits with the check digits of the sequence stored in said register and for determining the distance therebetween, normally disabled substitution means connected to said first means for registering the check digits calculated thereby in said register, and control means including third means responsive to said second means indicating that said distance is greater than a predetermined threshold number $e$, where $e$ is a positive integer defined such that the minimum distance between any two of said sequences is at least $2e+1$, for causing at least one permutation of the sequence stored in said register and for delivering energization signals to said first and second means, said control means further including fourth means responsive to said second means supplying a signal indicative of said distance being less than or equal to said threshold number for enabling said substitution means to substitute said calculated check digits for the check digits of the sequence in said register, said control means still further including fifth means responsive to the signal indicative of said distance being less than or equal to said threshold number for successively permuting the sequence stored in said register to compensate for the permutation(s) caused by said third means.

7. In combination in an information processing system for automatically correcting $n$-digit redundant sequences received from a noisy channel, where $n$ is a positive integer, a $n$-stage permutation register coupled to said channel for storing the digits of a received sequence in the respective stages thereof, a first gate circuit having $k$ output terminals and $k$ input terminals which are respectively connected to the outputs of $k$ of the stages of said register, where $k$ is a positive integer less than $n$, a parity check digit calculator having $n-k$ output terminals and having $k$ input terminals respectively connected to the $k$ output terminals of said first gate, a comparator circuit, a second gate circuit interconnecting said comparator circuit and the $n-k$ output terminals of said calculator, a third gate circuit having $n-k$ output terminals connected to said comparator circuit and having $n-k$ input terminals respectively connected to the outputs of the remaining $n-k$ stages of said register, a fourth gate circuit interconnecting the $n-k$ output terminals of said calculator to respective ones of said remaining $n-k$ register stages, and a control unit connected to said register and to said first through fourth gate circuits for applying signals thereto in accordance wih a predetermined decoding pattern.

References Cited by the Examiner

UNITED STATES PATENTS

| | | | |
|---|---|---|---|
| 2,968,027 | 1/1961 | McDonnell et al. | 340—172.5 |
| 3,041,476 | 6/1962 | Parker | 307—88.5 |
| 3,089,125 | 5/1963 | Reynolds | 340—172.5 |
| 3,123,803 | 3/1964 | Lisle et al. | 340—146.1 |
| 3,155,818 | 11/1964 | Goetz | 340—146.1 |
| 3,159,809 | 12/1964 | Fierston et al. | 340—146.1 |
| 3,159,810 | 12/1964 | Fire | 340—146.1 |
| 3,163,850 | 12/1964 | Austin et al. | 340—172.5 |
| 3,164,804 | 1/1965 | Burton | 340—146.1 |

OTHER REFERENCES

Wilkes, M. V.: Automatic Digital Computers, John Wiley & Sons, Inc., N.Y., 1957, QA 76.5 w5a, pages 62 and 63.

ROBERT C. BAILEY, *Primary Examiner.*

MALCOLM A. MORRISON, *Examiner.*

T. M. ZIMMER, J. P. VANDENBURG, *Assistant Examiners.*